United States Patent
Srinivasan

(10) Patent No.: US 7,752,042 B2
(45) Date of Patent: *Jul. 6, 2010

(54) METHODS AND APPARATUS TO OPERATE AN AUDIENCE METERING DEVICE WITH VOICE COMMANDS

(75) Inventor: Venugopal Srinivasan, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 261 days.

This patent is subject to a terminal disclaimer.

(21) Appl. No.: 12/024,559

(22) Filed: Feb. 1, 2008

(65) Prior Publication Data

US 2008/0120105 A1 May 22, 2008

Related U.S. Application Data

(63) Continuation of application No. 11/375,648, filed on Mar. 14, 2006, now Pat. No. 7,353,171, which is a continuation of application No. PCT/US2004/028171, filed on Aug. 30, 2004.

(60) Provisional application No. 60/503,737, filed on Sep. 17, 2003.

(51) Int. Cl.
G10L 21/02 (2006.01)
G10L 19/14 (2006.01)
G10L 21/00 (2006.01)
H04H 60/32 (2008.01)
H04L 23/00 (2006.01)

(52) U.S. Cl. .................. 704/233; 704/226; 704/234; 704/275; 725/14; 725/18; 375/377

(58) Field of Classification Search .................. 704/226, 704/233, 234, 275; 725/14, 18; 375/377

See application file for complete search history.

(56) References Cited

U.S. PATENT DOCUMENTS 4,060,695 A 11/1977 Suzuki et al.

(Continued)

FOREIGN PATENT DOCUMENTS

CA 2539442 4/2005

(Continued)

OTHER PUBLICATIONS

Udrea et al., "Speech Enhancement Using Spectral Oversubtraclion and Residual Noise Reduction", Proc. of the Symposium "SCS 2003", vol. 11, Iqi, Romania, Jul. 2003, pp. 165-169.*

(Continued)

*Primary Examiner*—David R Hudspeth
*Assistant Examiner*—Edgar Guerra-Erazo
(74) *Attorney, Agent, or Firm*—Hanley, Flight & Zimmerman, LLC

(57) ABSTRACT

Methods and apparatus to operate an audience metering device with voice commands are described herein. An example method to identify audience members based on voice, includes: obtaining an audio input signal including a program audio signal and a human voice signal; receiving an audio line signal from an audio output line of a monitored media device; processing the audio line signal with a filter having adaptive weights to generate a delayed and attenuated line signal; subtracting the delayed and attenuated line signal from the audio input signal to develop a residual audio signal; identifying a person that spoke to create the human voice signal based on the residual audio signal; and logging an identity of the person as an audience member.

27 Claims, 6 Drawing Sheets

U.S. PATENT DOCUMENTS

| | | | |
|---|---|---|---|
| 4,283,601 | A | 8/1981 | Nakajima et al. |
| 4,449,189 | A | 5/1984 | Feix et al. |
| 4,697,209 | A | 9/1987 | Kiewit et al. |
| 4,856,067 | A | 8/1989 | Yamada et al. |
| 4,907,079 | A | 3/1990 | Turner et al. |
| 4,947,436 | A | 8/1990 | Greaves et al. |
| 5,229,764 | A | 7/1993 | Matchett et al. |
| 5,250,745 | A | 10/1993 | Tsumura |
| 5,267,323 | A | 11/1993 | Kimura |
| 5,412,738 | A | 5/1995 | Brunelli et al. |
| 5,481,294 | A | 1/1996 | Thomas et al. |
| 5,611,019 | A | 3/1997 | Nakatoh et al. |
| 5,615,296 | A | 3/1997 | Stanford et al. |
| 5,765,130 | A | 6/1998 | Nguyen et al. |
| 5,774,859 | A | 6/1998 | Houser et al. |
| 5,809,041 | A * | 9/1998 | Shikakura et al. ............ 714/747 |
| 5,872,588 | A | 2/1999 | Aras et al. |
| 5,946,050 | A | 8/1999 | Wolff |
| 6,035,177 | A | 3/2000 | Moses et al. |
| 6,161,090 | A | 12/2000 | Kanevsky et al. |
| 6,317,881 | B1 | 11/2001 | Shah-Nazaroll et al. |
| 6,345,389 | B1 | 2/2002 | Dureau |
| 6,405,166 | B1 | 6/2002 | Huang et al. |
| 6,467,089 | B1 | 10/2002 | Aust et al. |
| 6,542,869 | B1 | 4/2003 | Foote |
| 6,560,349 | B1 * | 5/2003 | Rhoads ....................... 382/100 |
| 6,651,043 | B2 | 11/2003 | Ammicht et al. |
| 7,155,159 | B1 * | 12/2006 | Weinblatt et al. .......... 455/2.01 |
| 7,353,171 | B2 | 4/2008 | Srinivasan |
| 7,523,474 | B2 * | 4/2009 | Herley ......................... 725/19 |
| 2002/0010919 | A1 | 1/2002 | Lu et al. |
| 2002/0053077 | A1 | 5/2002 | Shah-Nazaroff et al. |
| 2002/0059577 | A1 | 5/2002 | Lu et al. |
| 2002/0120925 | A1 | 8/2002 | Logan |
| 2002/0174425 | A1 | 11/2002 | Markel et al. |
| 2002/0194586 | A1 | 12/2002 | Gutta et al. |
| 2003/0005431 | A1 | 1/2003 | Shinohara |
| 2003/0028872 | A1 | 2/2003 | Milovanovic et al. |
| 2003/0126593 | A1 | 7/2003 | Mault |
| 2005/0149965 | A1 | 7/2005 | Neogi |
| 2006/0100868 | A1 * | 5/2006 | Hetherington et al. ...... 704/226 |
| 2006/0200841 | A1 | 9/2006 | Ramaswamy et al. |

FOREIGN PATENT DOCUMENTS

| | | |
|---|---|---|
| GB | 2 294 574 A | 1/1996 |
| TW | 200516467 | 5/2005 |
| WO | WO 99/27668 | 6/1999 |
| WO | 2005034395 | 4/2005 |

OTHER PUBLICATIONS

International Search Report correspondence to International Application No. PCT/US2004/028171, Aug. 24, 2005.

Written Opinion of the International Searching Authority corresponding to International Application No. PCT/US2004/028171, Aug. 24, 2005.

International Preliminary Examination Report corresponding to International Application No. PCT/US2004/028171, Apr. 7, 2006.

Auditory Processing of Speech Signals for Robust Speech Recognition Real-World Noisy Environments, Kim et al., Jan. 1999, 15 pages.

United States Patent and Trademark Office, "Notice of Allowance," issued in connection with U.S. Appl. No. 11/375,648, on Nov. 2, 2007 (6 pages).

* cited by examiner

METHODS AND APPARATUS TO OPERATE AN AUDIENCE METERING DEVICE WITH VOICE COMMANDS

RELATED APPLICATION

This patent arises from a continuation of U.S. application Ser. No. 11/375,648 which was filed on Mar. 14, 2006, which is a continuation of International Application Serial No. PCT/US2004/028171, which was filed on Aug. 30, 2004 and which claims priority from U.S. Provisional Application Ser. No. 60/503,737, filed Sep. 17, 2003. U.S. application Ser. No. 11/375,648, International Application Serial No. PCT/US2004/028171, and U.S. Provisional Application Ser. No. 60/503,737 are all incorporated herein by reference.

TECHNICAL FIELD

The present disclosure relates generally to audience measurement, and more particularly, to methods and apparatus to operate an audience metering device with voice commands.

BACKGROUND

Determining the demographics of a television viewing audience helps television program producers improve their television programming and determine a price for advertising during such programming. In addition, accurate television viewing demographics allows advertisers to target certain types of audiences. To collect the demographics of a television viewing audience, an audience measurement company may enlist a number of television viewers to cooperate in an audience measurement study for a predefined length of time. The viewing behavior of these enlisted viewers, as well as demographic data about these enlisted viewers, is collected and used to statistically determine the demographics of a television viewing audience. In some cases, automatic measurement systems may be supplemented with survey information recorded manually by the viewing audience members.

Audience measurement systems typically require some amount of on-going input from the participating audience member. One method of collecting viewer input involves the use of a people meter. A people meter is an electronic device that is typically disposed in the viewing area and that is proximate to one or more of the viewers. The people meter is adapted to communicate with a television meter disposed in, for example, a set top box, that measures various signals associated with the television for a variety of purposes including, but not limited to, determining the operational status of the television (i.e., whether the television is on or off), and identifying the programming being displayed by the television. Based on any number of triggers, including, for example a channel change or an elapsed period of time, the people meter prompts the household viewers to input information by depressing one of a set of buttons; each of which is assigned to represent a different household member. For example, the people meter may prompt the viewers to register (i.e., log in), or to indicate that they are still present in the viewing audience. Although periodically inputting information in response to a prompt may not be burdensome when required for an hour, a day or even a week or two, some participants find the prompting and data input tasks to be intrusive and annoying over longer periods of time. Thus, audience measurement companies are researching different ways for participants to input information to collect viewing data and provide greater convenience for the participants.

Today, several voice-activated systems are commercially available to perform a variety of tasks including inputting information. For example, users can log in to a computer network by a unique voice command detected by a microphone and authenticated by an algorithm that analyzes the speech signal. In another example, there are home automation appliances that can be turned on and off by voice commands. However, current voice-activated systems are designed to operate in acoustically clean environments. In the case of logging into a computer network, for example, the user speaks directly into a microphone and very little ambient noise is present. In contrast, a major source of interference in an audience measurement system is present in the form of audio output by, for example, speakers of a media presentation device such as a television. If a microphone is built into a people meter, the microphone may pick up pick up significant audio signals from the television speakers that make it difficult to recognize voice commands.

DETAILED DESCRIPTION

Although the following discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in firmware, exclusively in software or in some combination of hardware, firmware, and/or software.

Figure 1:
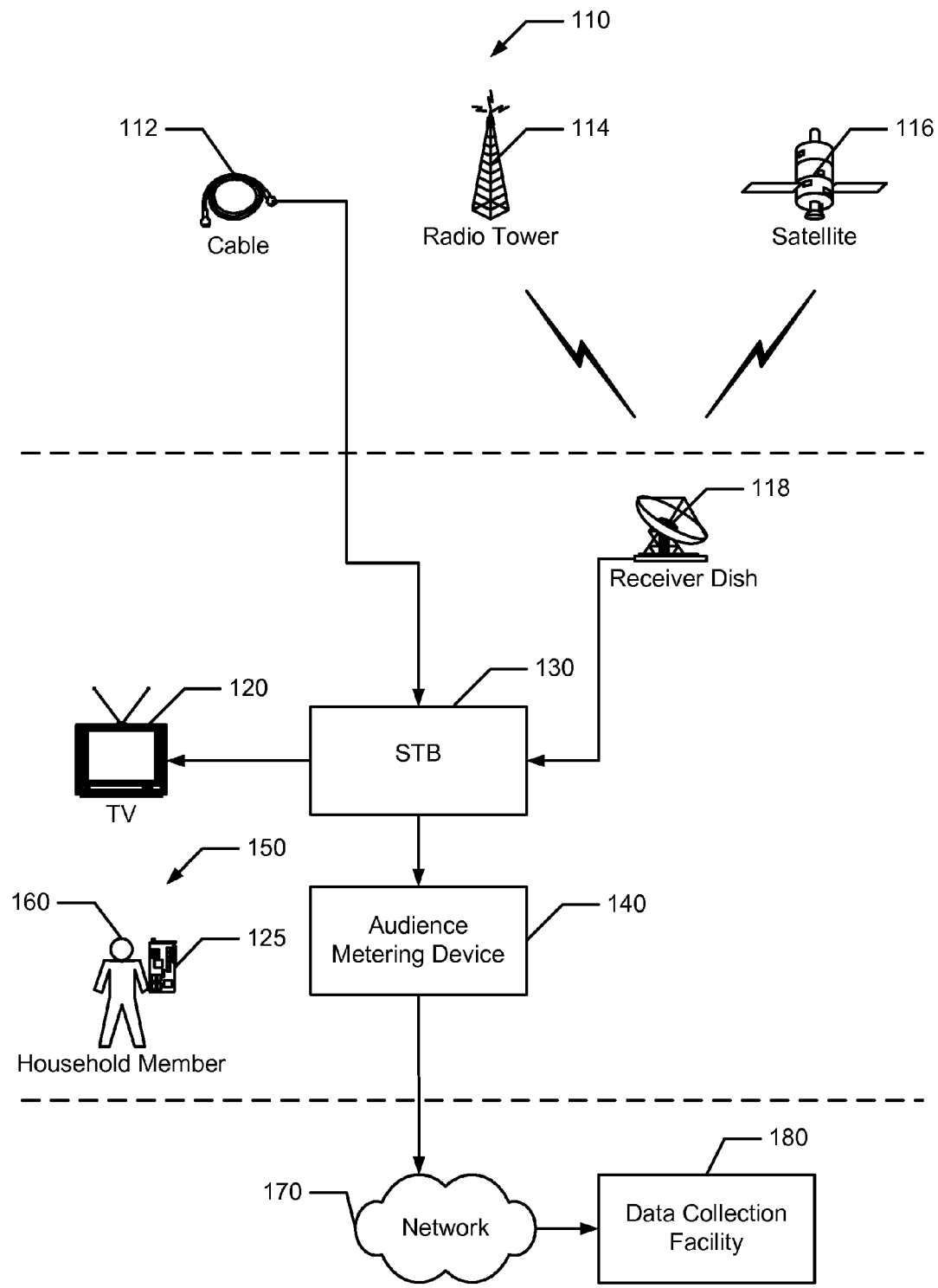
FIG. 1 is a block diagram representation of an example broadcast system and an example audience metering system.

In the example of FIG. 1, an example broadcast system 100 including a service provider 110, a television 120, a remote control device 125, and a set top box (STB) 130, is metered using an audience measurement system. The components of the broadcast system 100 may be coupled in any well known manner. In the illustrated example, the television 120 is positioned in a viewing area 150 located within a house occupied by one or more people, referred to as household member(s) 160, all of whom have agreed to participate in an audience measurement research study. The viewing area 150 includes the area in which the television 120 is located and from which the television 120 may be viewed by the household member(s) 160 located in the viewing area 150.

In the illustrated example, an audience metering device 140 is provided to collect viewing information with respect to the household member(s) 160 in the viewing area 150. The audience metering device 140 provides this viewing information as well as other tuning and/or demographic data via a network 170 to a data collection facility 180. The network 170 may be implemented using any desired combination of hardwired and wireless communication links, including for example, the Internet, an Ethernet connection, a digital subscriber line (DSL), a telephone line, a cellular telephone system, a coaxial cable, etc. The data collection facility 180 may be configured to process and/or store data received from the audience metering device 140 to produce ratings information.

The service provider 110 may be implemented by any service provider such as, for example, a cable television service provider 112, a radio frequency (RF) television service provider 114, and/or a satellite television service provider 116. The television 120 receives a plurality of television signals transmitted via a plurality of channels by the service provider 110 and may be adapted to process and display television signals provided in any format such as a National Television Standards Committee (NTSC) television signal format, a high definition television (HDTV) signal format, an Advanced Television Systems Committee (ATSC) television signal format, a phase alteration line (PAL) television signal format, a digital video broadcasting (DVB) television signal format, an Association of Radio Industries and Businesses (ARIB) television signal format, etc.

The user-operated remote control device 125 allows a user to cause the television 120 to tune to and receive signals transmitted on a desired channel, and to cause the television 120 to process and present the programming content contained in the signals transmitted on the desired channel. The processing performed by the television 120 may include, for example, extracting a video component and/or an audio component delivered via the received signal, causing the video component to be displayed on a screen/display associated with the television 120, and causing the audio component to be emitted by speakers associated with the television 120. The programming content contained in the television signal may include, for example, a television program, a movie, an advertisement, a video game, and/or a preview of other programming content that is currently offered or will be offered in the future by the service provider 110.

While the components shown in FIG. 1 are depicted as separate structures within the broadcast system 100, the functions performed by these structures may be integrated within a single unit or may be implemented using two or more separate components. For example, although the television 120 and the STB 130 are depicted as separate structures, persons of ordinary skill in the art will readily appreciate that the television 120 and the STB 130 may be integrated into a single unit. In another example, the STB 130 and the audience metering device 140 may also be integrated into a single unit. In fact, the television 120, the STB 130, and the audience metering device 140 may be integrated into a single unit as well.

The audience metering device 140 may include several sub-systems to perform tasks such as determining the channel being viewed. For example, the audience metering device 140 may be configured to identify the tuned channel from audio watermarks that have been embedded in the television audio. Alternatively, the audience metering device 140 may be configured to identify tuned program by taking program signatures and/or detecting video and/or audio codes embedded in the broadcast signal. For example, the audience metering device 140 may have audio inputs to receive a line signal directly from an audio line output of the television 120. If the television 120 does not have an audio line output, probes may be attached to one or more leads of the television speaker (not shown).

For the purpose of identifying the demographic information of an audience, the measurement device is configured to identify the member of the audience viewing the associated television. To this end, the audience metering device 140 is provided with a prompting mechanism to request the audience member to identify themselves as present in the audience. These prompts can be generated at particular time intervals and/or in response to predetermined events such as channel changes. The prompting mechanism may be implemented by, for example, light emitting diodes (LEDs), an on-screen prompt, an audible request via a speaker, etc.

Whereas prior art devices were structured to respond to electronic inputs from the household member(s) 160 (e.g., inputs via remote control devices, push buttons, switches, etc.) to identify the individual(s) in the audience, the audience metering device 140 of the illustrated example is configured to respond to voice commands from the household member(s) 160 as described in detail below. In particular, the household member(s) 160 are able to signal his/her presence and/or his/her exit from the viewing area 150 by a voice command. In general, the voice commands may be received by the audience metering device 140 via a microphone or a microphone array and processed by the audience metering device 140. The household member(s) 160 may be more likely to respond to prompts from the audience metering device 140 using voice commands than by using other input methods because providing a voice command only requires one to speak.

The voice activation system of the audience metering device 140 may be implemented in many different ways. For example, several voice-activated systems are commercially available to perform a variety of tasks such as logging into a computer and activating home automation appliances voice commands. However, many of the current voice-activated systems are designed to operate in acoustically clean environments. For example, a user may log into a computer by speaking directly into a microphone such that very little ambient noise is present to interfere with the received signal. In contrast, in the context of FIG. 1, a major source of interference is present in the form of audio output by the television speakers. If a microphone is built into the audience metering device 140, the microphone will typically be located a distance away from the household member(s) 160 and thus, will pick up significant audio signals from the television 120 that make it difficult to recognize voice commands. Therefore, to recognize voice command(s) emanating from the household member(s) 160, the audience metering device 140 extracts and cancels television audio signals from the audio signals received via the microphone as explained below.

Figure 2:
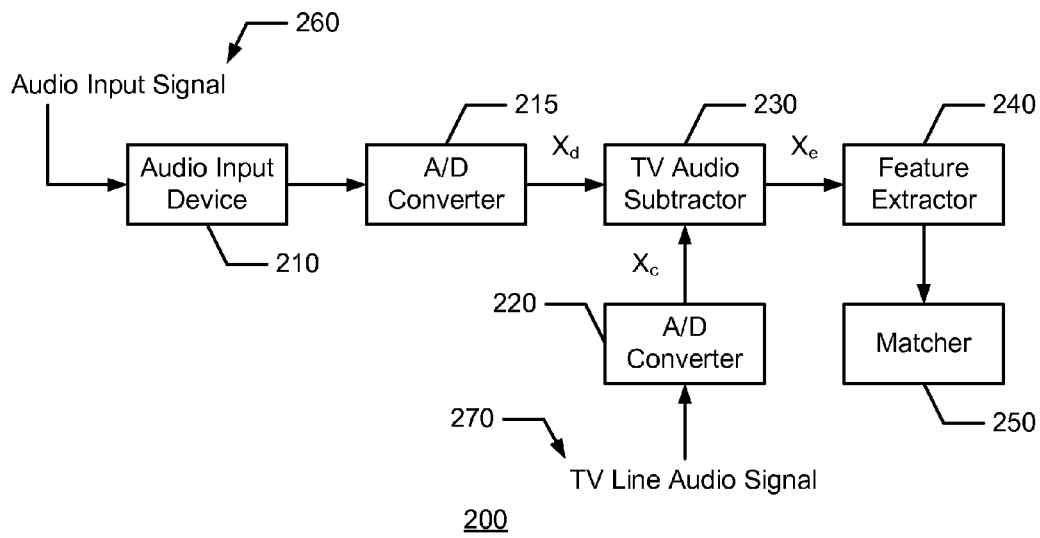
FIG. 2 is a block diagram representation of an example audience metering device.

In the example of FIG. 2, the illustrated audience metering device 140 includes an audio input device 210, a first analog-to-digital (A/D) converter 215, a second A/D converter 220, a television audio subtractor 230, a mel frequency cepstral coefficients (MFCC) feature extractor 240, and a matcher 250. The audio input device 210 is configured to pick up an audio input signal 260 in a directional fashion. For example, the audio input device 210 may be a microphone and/or a microphone array attached to the front panel of the audience metering device 140. The audio input device 210 is preferably configured to pick up voice commands from anywhere in the viewing area 150 of the television 120. Example voice commands that may be received from the household member(s)

160 include commands indicating: which household member(s) 160 are present in the audience, the tuned channel, and/or the tuned TV program. Further, the audience metering device 140 may also be configured to receive a viewer response from the household member(s) 160 such as "yes" or "no" to an inquiry. The audio input signal 260 received by the audio input device 210 includes a mixture of voice command(s) and/or television program audio signal(s). The audio input device 210 also picks up any other ambient noise, which is typically low energy and insignificant. Such ambient noise is, therefore, ignored for the remainder of the discussion. The first A/D converter 215 digitizes the audio input signal 260 received from the audio input device 210 (i.e., $X_d$) for the TV audio subtractor 230.

In general, the audience metering device 140 uses an adaptive filter to reduce or remove the television audio signals from the audio input signal 260. The audience metering device 140 uses a signal representation of the television audio signals received from a line audio output of the television 120 to substantively filter these television audio signals from the audio input signal 260. The filtered audio signal is then processed by a voice command recognizer algorithm. More particularly, the audience metering device 140 of FIG. 2 receives a television line audio signal 270, which is digitized by the second A/D converter 220 (i.e., $X_c$). The television audio subtractor 230 then subtracts the television line audio signal 270 from the audio input signal 260 and outputs a residual signal containing one or more voice commands from the household member(s) 160 (i.e., $X_e$).

The MFCC extractor 240 extracts feature vectors from the residual signal output by the television audio subtractor 230. The feature vectors correspond to the one or more voice commands from the household member(s) 160. Through a cross-correlation operation described in detail below, the matcher 250 then compares the feature vectors against stored vector sequences to identify valid voice commands. For example, the stored vector sequences may be generated during a training phase when each of the household member(s) 160 issues voice commands that are recorded and processed. The stored vector sequences may be stored in a memory (e.g., the main memory 1030 and/or the mass storage device 1080 of FIG. 7).

Preferably, the voice recognition algorithm is speaker-dependent and uses a relatively small set of particular voice commands. This contrasts with commercially-available speech recognizers that are speaker-independent and use relatively large vocabulary sets. Because of this difference, the audience metering device 140 may be implemented with much lower-power processor than the processor required by the commercially-available speech recognizers.

In one manner of operating the audience metering device 140 with voice commands, consider an example in which the audio input signal 260 is sampled at a sampling rate of 16 kHz (persons of ordinary skill in the art will appreciate that other sampling rates such as 8 kHz may alternatively be used). In general, the television program audio signal(s) received by the audio input device 210 are delayed relative to the television line audio signal 270 because of the propagation delay of sound waves emanating from the speakers of the television 120 and arriving at the audio input device 210. Further, multiple sound wave paths may exist because of reflections from walls and other objects in the viewing area 150. Also, the acoustic wave associated with the television program audio signals is attenuated in amplitude within its path to the audio input device 210.

To reduce the differences between the television line audio signal 270 and the audio signal 260 received by the audio input device 210, the television audio subtractor 230 may include a difference detector 310 and a finite impulse response (FIR) filter 320 having adaptive weights to delay and attenuate the television line audio signal 270 in accordance with the condition in the viewing area 150. An example television audio subtractor 230 is shown in greater detail in FIG. 3. While the difference detector 310 and the FIR filter 320 are depicted in FIG. 3 as being integrated within the television audio subtractor 230, the difference detector 310 and the FIR filter 320 may be implemented using two or more separate integrated circuits.

Figure 3:
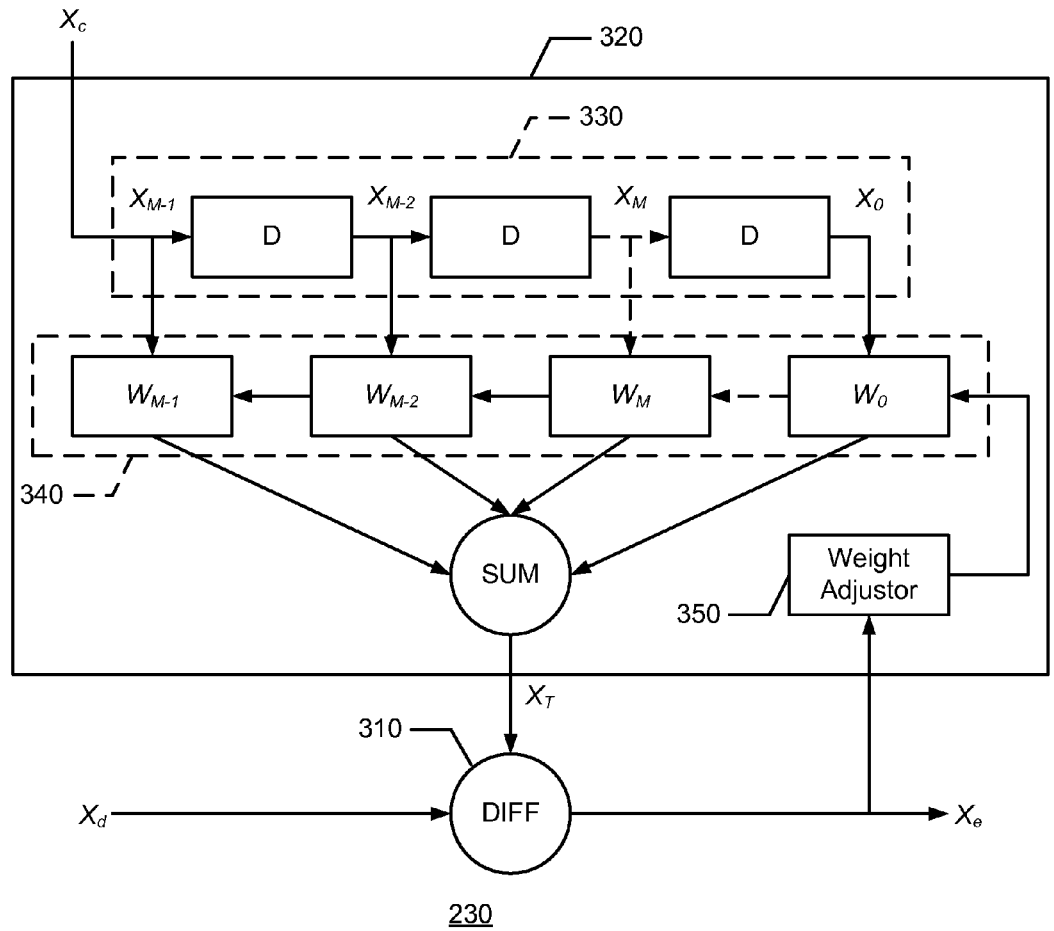
FIG. 3 is a block diagram representation of an example finite impulse response (FIR) filter of the example audience metering device of FIG. 2.

In the example of FIG. 3, the FIR filter 320 includes a delay line 330, one or more filter weights 340 (i.e., filter taps), and a weight adjustor 350. The television line audio signal 270 is sampled. The samples $X_c$ are then passed through the delay line 330. The delay line 330 is a set of M shift-registers D, wherein $X_{M-1}$ is the most recent sample and $X_0$ is the earliest sample. The output of the filter 320 is the summation of the weighted samples (i.e., $X_T$). This output can be represented by the equation $$X_T = \sum_{m=0}^{m=M-1} W_m X_m$$

where $W_m$, m=0, 1, ... M−1 are filter weights 340 with initial values set to 0. The signal $X_d$ is defined as the current audio input sample 260 from the audio input device 210. The filter 320 is configured to output $X_T \approx X_d$. In the illustrated example, the weight adjustor 350 adjusts the filter weights 340 to new values based on the error signal $X_e(n)=X_d(n)-X_T(n)$. In particular, the new values of the filter weights 340 are represented by the equation $W_m(n+1)=W_m(n)+\mu X_e X_m(n)$ where the index n is an iteration index denoting the time in sample counts at which the modification is made and μ is a learning factor usually set to a low value such as 0.05. Persons of ordinary skill in the art will readily recognize that this filter gradually minimizes the least mean squared (LMS) error. In fact, the error signal $X_e$ is the desired signal because the error signal $X_e$ contains the one or more voice commands from the household member(s) 160. The difference detector 310 generates the error signal $X_e$ based on the output of the filter 320 $X_T$ and the current audio input sample $X_d$.

In a practical implementation using 16 kHz sampling rates, for example, the filter weights 340 includes $W_0$ through $W_{M-1}$ where M=400. A maximum time delay of 25 milliseconds exists between the television line audio signals 270 and the audio input signal 260 received by the audio input device 210 after propagation delays. In less than a second, the filter weights 340 adapt themselves to relatively stationery values and the error signal $X_e$ contains virtually no television program audio signals. Accordingly, the MFCC vectors are extracted from the sequence of samples $s(n)=X_e(n)$ (i.e., from the difference between the audio input signal 260 and the weighted television line audio signal 270). These vectors can then be compared with the MFCC vectors of stored voice commands to identify voice command in the audio input signal 260 (if any).

Figure 4:
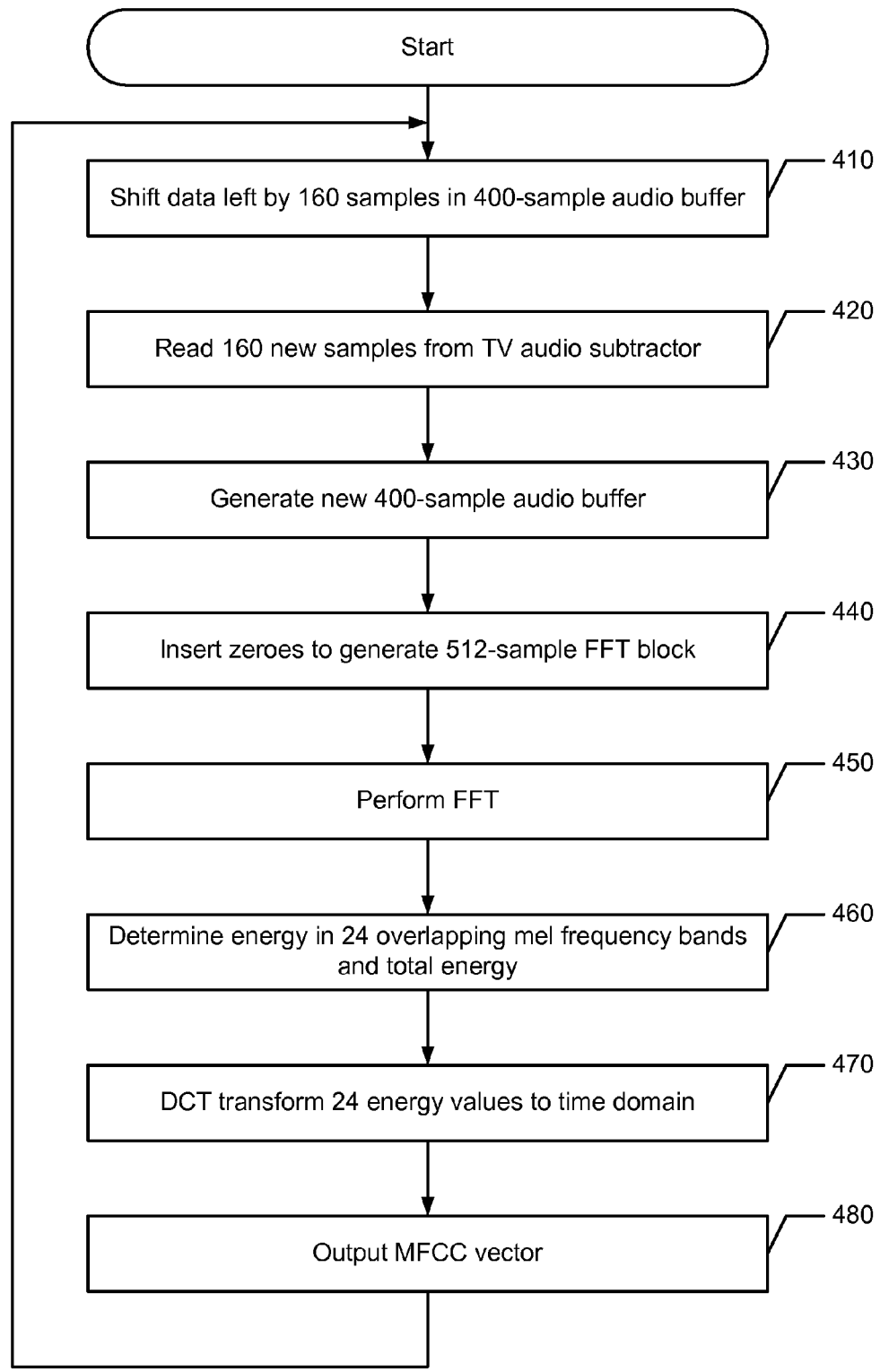
FIG. 4 is a flow diagram representation of example machine accessible instructions that may be executed to implement the example FIR filter of FIG. 2.

To compare the extracted MFCC vectors to the stored vectors, an audio buffer consisting of 400 samples (25 ms duration) $s_k$, k=0, 1, ... 399 is processed as shown by the flow diagram 400 of FIG. 4. The flow diagram 400 is merely provided and described in conjunction with the components of FIG. 2 as an example of one way to configure a system to process the audio buffer. The flow diagram 400 begins with shifting data of the 400-sample audio buffer to the left by 160 samples and added to the buffer (block 410). Then 160 "new" samples are read from the TV audio subtractor 230 (block 420). Accordingly, this buffer includes 240 "old" samples and 160 "new" samples to generate another 400-sample audio buffer (block 430). The new 160-samples in the audio buffer represent a 10 ms block of audio. Therefore, processing is done in 10 ms steps. The 400-sample block is padded with zeros to increase the length to 512 samples (block 440) so that the buffer includes enough samples for computing the spectrum using the well-known Fast Fourier Transform (FFT) algorithm (block 450). Persons of ordinary skill in the art will readily recognize that a windowing function w(k) is also applied for digital signal processing functions to minimize block boundary effects.

The FFT spectrum of the 512-sample block is $$S_u = \sum_{k=0}^{k=511} s_k e^{\frac{j2\pi u k}{512}}$$

for u=0, 1, ... 511. Persons of ordinary skill in the art will readily recognize that the MFCC coefficients are computed from 24 log spectral energy values $E_c$, c=0, 1, ... 23 obtained by grouping the FFT spectrum into a set of overlapping mel filter frequency bands:

$$E_c = \log\left(\sum_{u=b_{clow}}^{u=b_{chigh}} |S_u|^2\right)$$

where $b_{clow}$ and $b_{chigh}$ are the lower and upper bounds of the mel frequency band c (block 460). The 24 log spectral energy values are transformed by a Discrete Cosine Transform (DCT) to yield 23 coefficients:

$$C_k = \sqrt{\frac{2}{N}} \sum_{c=0}^{c=23} E_c \cos\frac{\pi(2c+1)k}{2N}$$

for k=1 through 23 and N=24 is the number of filter outputs (block 470). Of these 23 coefficients, the first twelve coefficients are usually retained as the MFCC elements because the first twelve coefficients represent the slowly varying spectral envelope corresponding to the vocal tract resonances. The coefficient $C_0$, which represents the total energy in the block, may be calculated separately as, $$C_0 = \log\left(\sum_{u=0}^{u=511} |S_u|^2\right)$$

and included as the thirteenth element of the MFCC feature vectors (block 480).

Prior to operating the audience metering device 140 with voice commands, the audience metering device 140 captures a set of voice commands from each of the household member(s) 160 as data files during a learning/training phase. The voice commands are edited so that each voice command contains the same number of samples. For example, a suitable value is 8000 samples with a duration of 500 ms. When analyzed as 10 ms segments, each voice command yields a sequence of 50 MFCC feature vectors. These MFCC feature vectors are stored as references in the matcher 250 for use during the operating phase of the audience metering device 140.

When the audio input signal 260 is received at the audio input device 210 in either the learning/training phase or the operating phase, the audio input signal 260 is sampled at 16 kHz and 160-sample segments are used to generate a sequence of MFCC vectors using, for example, the process explained above in connection with FIG. 4. The sequence of MFCC vectors are stored in a circular buffer (not shown).

Figure 5:
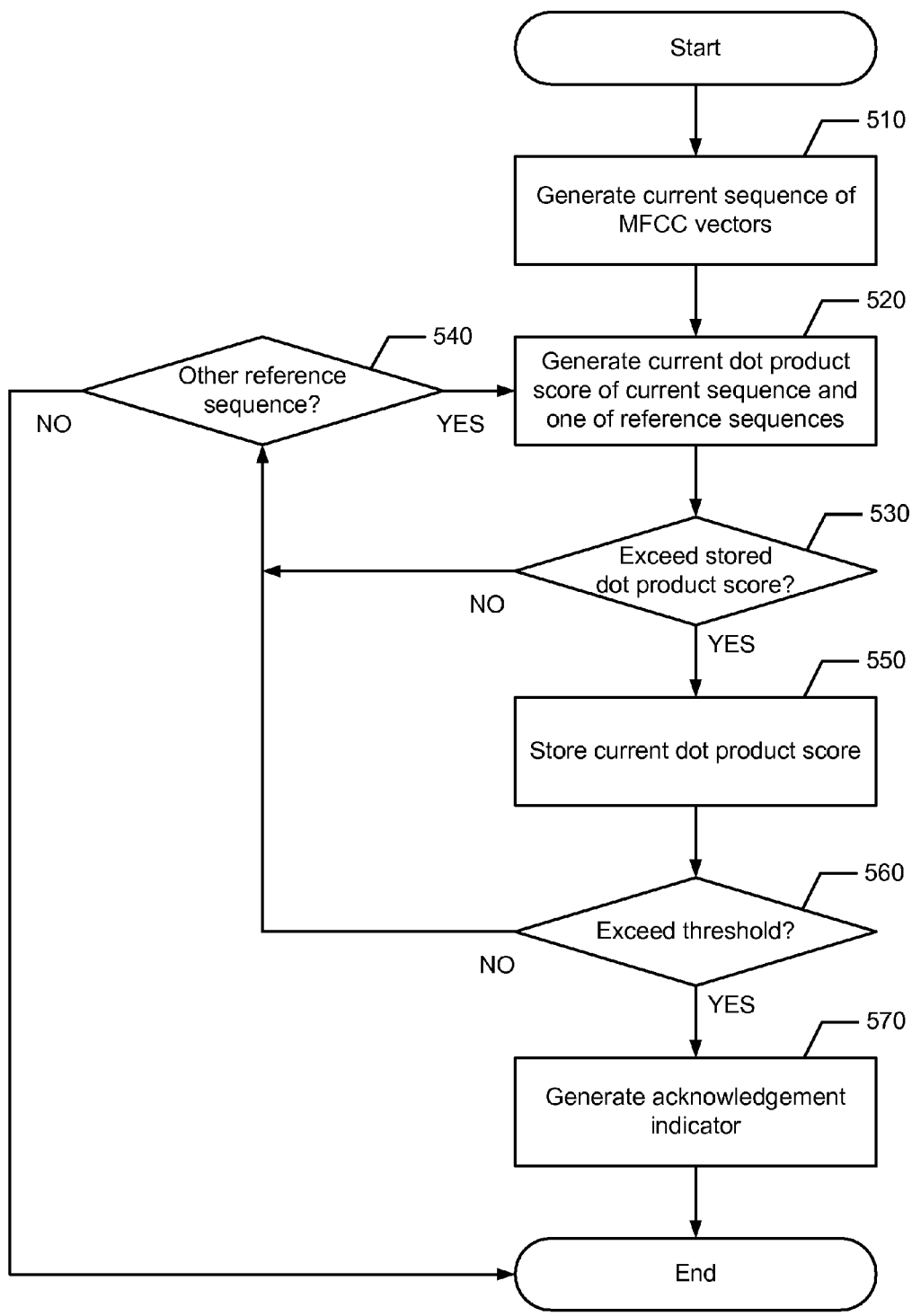
FIG. 5 is a flow diagram representation of example machine accessible instructions that may be executed to implement an example matcher of the example audience metering device of FIG. 2.

To identify a voice command, an example matching process 500 of FIG. 5 begins generating a current sequence of MFCC vectors with the data in the circular buffer described above (block 510). The matcher 250 compares the current sequence of MFCC vectors to each of the reference sequences stored after receipt of each 160-sample segment (block 520). In one particular example, the matcher 250 generates a current dot product score with a value in the range −1.0 to +1.0 for the current sequence of MFCC vectors and each of the reference sequences. The highest dot product score is taken as the best match. Accordingly, the matcher 250 compares the current dot product score to a stored dot product score (block 530). For example, the stored dot product score may correspond to the highest dot product score that was previously generated between the current sequence of MFCC vectors and one of the reference sequences. If the current dot product score is less than or equal to the stored dot product score then the matcher 250 determines whether there are other reference sequences to compare to the current sequence of MFCC vectors (block 540). If there are other reference sequences to compare to the current sequence of MFCC vectors, control returns to block 520 to generate another dot product score associated with the current sequence of MFCC vectors and one of the other reference sequences (i.e., the next reference sequence). Otherwise, if there is no additional reference sequence to compare to the current sequence of MFCC vectors, the process 500 terminates.

Returning to block 530, if the current dot product score is greater than the stored dot product score, the matcher 250 may replace the stored dot product score with the current dot product score as the highest dot product score (block 550). Further, the matcher 250 may determine if the current dot product score exceeds a predetermined threshold (which may be pre-set at, for example, 0.5) (block 560). If the current dot product score is less than or equal to the threshold, the matcher 250 proceeds to block 540 to determine whether there are other reference sequences to compare to the current sequence of MFCC vectors as described above. In particular, the matcher 250 may return to block 520 if there are other reference sequences to compare to the current sequence of MFCC vectors or the matcher 250 may terminate the process 500 if there is no additional reference sequence. Otherwise if the current dot product score exceeds the threshold (block 560), the voice command is recognized, and the audience metering device 140 issues an LED prompt and/or any other suitable type of indicator to the household member(s) 160 acknowledging the voice command (block 570).

Figure 6:
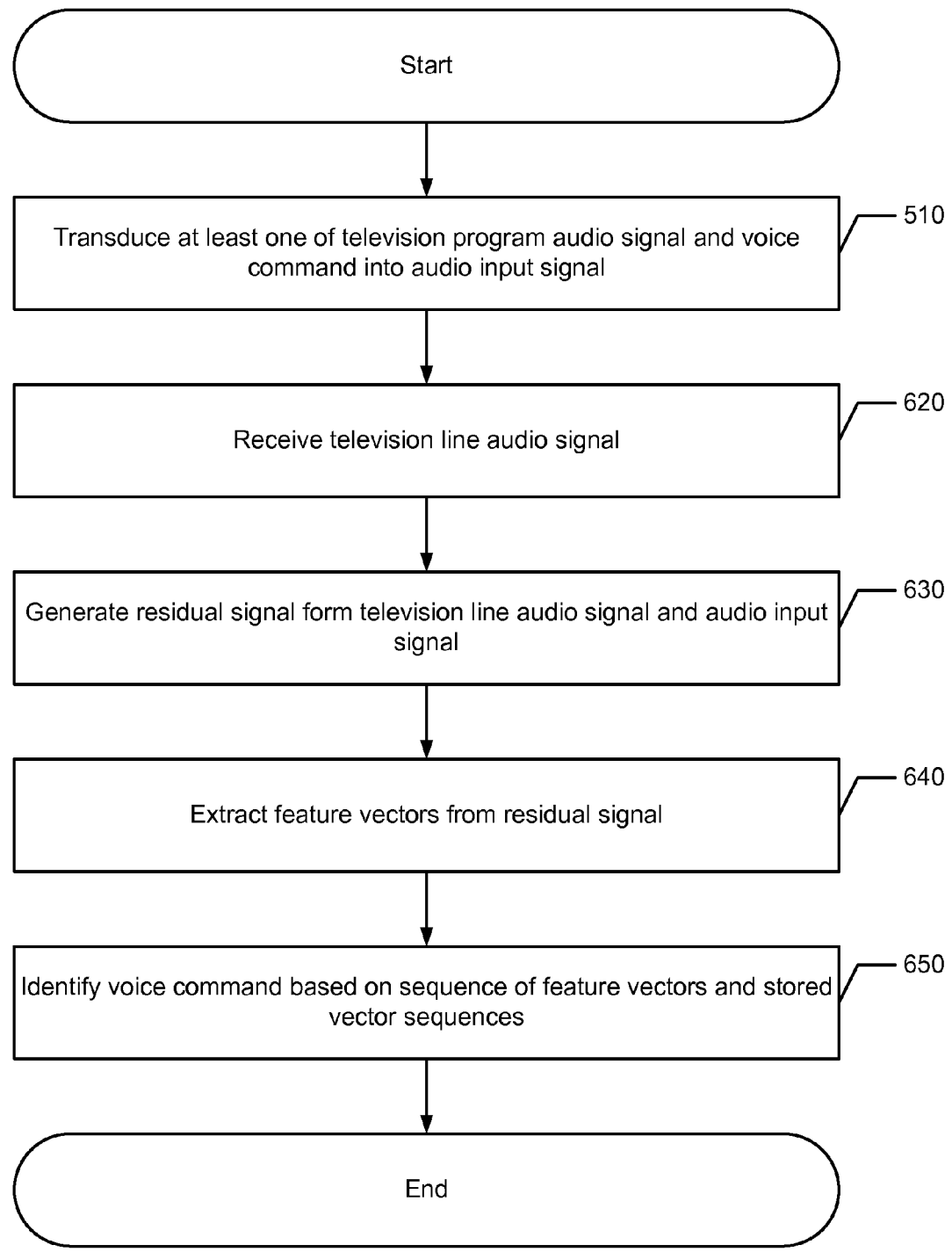
FIG. 6 is a flow diagram representation of example machine accessible instructions that may be executed to implement the example audience metering device of FIG. 2

A flow diagram 600 representing machine accessible instructions that may be executed by a processor to operate an audience metering device with voice commands is illustrated in FIG. 6. Persons of ordinary skill in the art will appreciate that the instructions may be implemented in any of many different ways utilizing any of many different programming codes stored on any of many different machine accessible mediums such as a volatile or nonvolatile memory or other mass storage device (e.g., a floppy disk, a CD, and a DVD). For example, the machine accessible instructions may be embodied in a machine accessible medium such as an erasable programmable read only memory (EPROM), a read only memory (ROM), a random access memory (RAM), a magnetic media, an optical media, and/or any other suitable type of medium. Alternatively, the machine accessible instructions may be embodied in a programmable gate array and/or an application specific integrated circuit (ASIC). Further, although a particular order of actions is illustrated in FIG. 6, persons of ordinary skill in the art will appreciate that these actions can be performed in other temporal sequences. Again, the flow diagram 600 is merely provided as an example of one way to operate an audience metering device with voice commands.

In the example of FIG. 6, the audience metering device 140 transduces an audio input signal 260 via the audio input device 210 (block 610). As noted above, the audio input signal 260 may include television program audio signals, voice commands, ambient noise, etc. To cancel the television program audio signals from the audio input signal 260, the audience metering device 140 receives a television line audio signal 270 from the television 120 (block 620). Based on the audio input signal 260 and the television line audio signal 270, the audience metering device 140 generates a residual signal (block 630). In particular, the audience metering device 140 uses the television line audio signal 270 to filter out the extraneous signals such as television program audio signal from the audio input signal 260. Because the television line audio signal 270 does not include the voice commands and/or other sounds in the view area 150, the residual signal includes voice commands without the television program audio signal. The audience metering device 140 extracts one or more feature vectors from the residual signal using, for example, the process explained above in connection with FIG. 4 (block 640). Accordingly, the audience metering device 140 identifies one or more voice commands by comparing and matching a sequence of the feature vectors with stored reference sequences of valid voice commands (block 650). As a result, the audience metering device 140 operates with voice commands.

Figure 7:
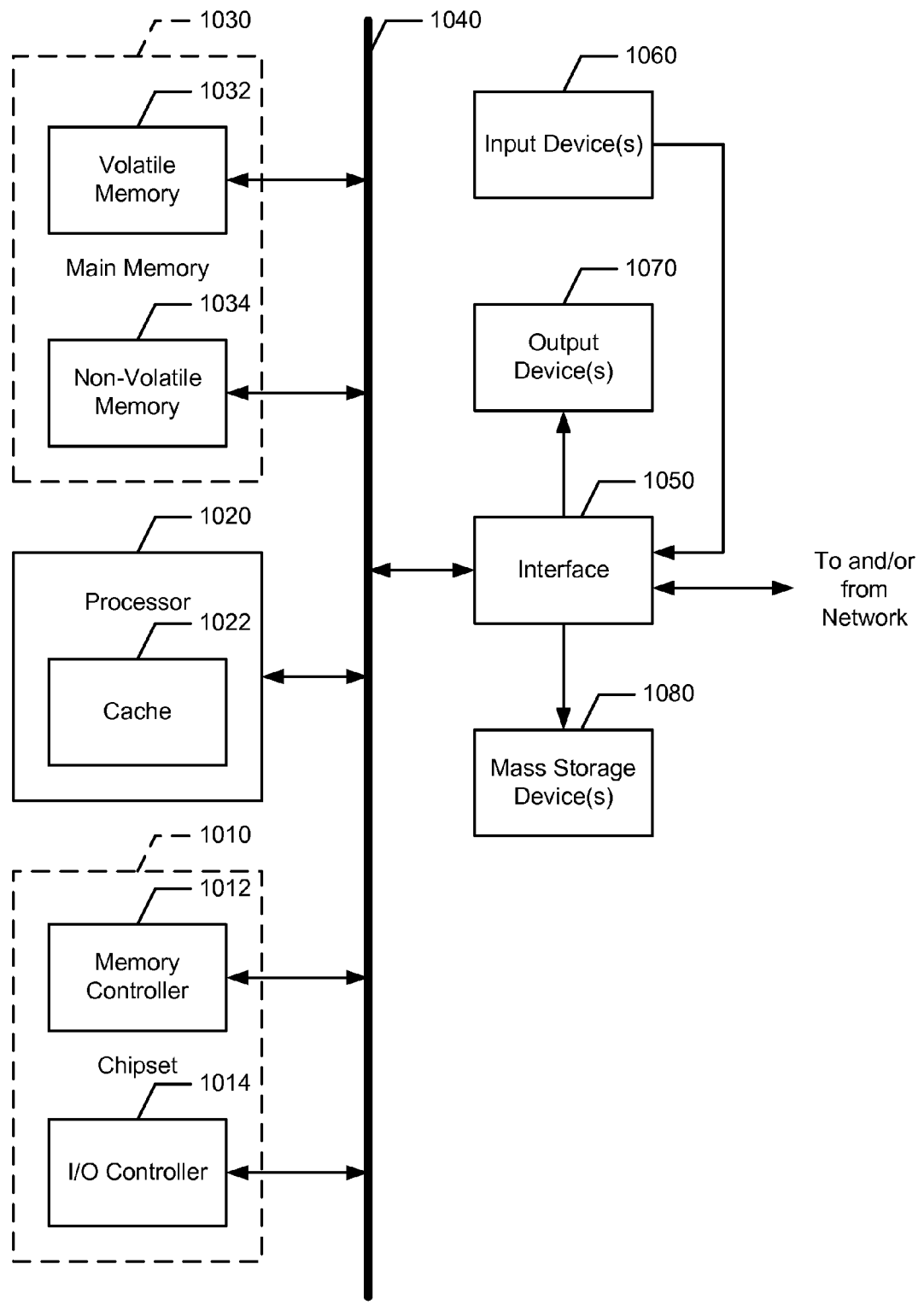
FIG. 7 is a block diagram representation of an example processor system that may be used to implement the audience metering device of FIG. 2.

FIG. 7 is a block diagram of an example processor system 1000 adapted to implement the methods and apparatus disclosed herein. The processor system 1000 may be a desktop computer, a laptop computer, a notebook computer, a personal digital assistant (PDA), a server, an Internet appliance or any other type of computing device.

The processor system 1000 illustrated in FIG. 7 includes a chipset 1010, which includes a memory controller 1012 and an input/output (I/O) controller 1014. As is well known, a chipset typically provides memory and I/O management functions, as well as a plurality of general purpose and/or special purpose registers, timers, etc. that are accessible or used by a processor 1020. The processor 1020 is implemented using one or more processors. The processor 1020 includes a cache 1022, which may be implemented using a first-level unified cache (L1), a second-level unified cache (L2), a third-level unified cache (L3), and/or any other suitable structures to store data as persons of ordinary skill in the art will readily recognize.

As is conventional, the memory controller 1012 performs functions that enable the processor 1020 to access and communicate with a main memory 1030 including a volatile memory 1032 and a non-volatile memory 1034 via a bus 1040. The volatile memory 132 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1034 may be implemented using flash memory, Read Only Memory (ROM), Electrically Erasable Programmable Read Only Memory (EEPROM), and/or any other desired type of memory device.

The processor system 1000 also includes an interface circuit 1050 that is coupled to the bus 1040. The interface circuit 1050 may be implemented using any type of well known interface standard such as an Ethernet interface, a universal serial bus (USB), a third generation input/output interface (3GIO) interface, and/or any other suitable type of interface.

One or more input devices 1060 are connected to the interface circuit 1050. The input device(s) 1060 permit a user to enter data and commands into the processor 1020. For example, the input device(s) 1060 may be implemented by a keyboard, a mouse, a touch-sensitive display, a track pad, a track ball, an isopoint, and/or a voice recognition system.

One or more output devices 1070 are also connected to the interface circuit 1050. For example, the output device(s) 1070 may be implemented by display devices (e.g., a light emitting display (LED), a liquid crystal display (LCD), a cathode ray tube (CRT) display, a printer and/or speakers). The interface circuit 1050, thus, typically includes, among other things, a graphics driver card.

The processor system 1000 also includes one or more mass storage devices 1080 configured to store software and data. Examples of such mass storage device(s) 1080 include floppy disks and drives, hard disk drives, compact disks and drives, and digital versatile disks (DVD) and drives.

The interface circuit 1050 also includes a communication device such as a modem or a network interface card to facilitate exchange of data with external computers via a network. The communication link between the processor system 1000 and the network may be any type of network connection such as an Ethernet connection, a digital subscriber line (DSL), a telephone line, a cellular telephone system, a coaxial cable, etc.

Access to the input device(s) 1060, the output device(s) 1070, the mass storage device(s) 1080 and/or the network is typically controlled by the I/O controller 1014 in a conventional manner. In particular, the I/O controller 1014 performs functions that enable the processor 1020 to communicate with the input device(s) 1060, the output device(s) 1070, the mass storage device(s) 1080 and/or the network via the bus 1040 and the interface circuit 1050.

While the components shown in FIG. 7 are depicted as separate blocks within the processor system 1000, the functions performed by some of these blocks may be integrated within a single semiconductor circuit or may be implemented using two or more separate integrated circuits. For example, although the memory controller 1012 and the I/O controller 1014 are depicted as separate blocks within the chipset 1010, persons of ordinary skill in the art will readily appreciate that the memory controller 1012 and the I/O controller 1014 may be integrated within a single semiconductor circuit.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method to identify audience members based on voice, the method comprising:
   obtaining an audio input signal including a program audio signal and a human voice signal;
   receiving an audio line signal from an audio output line of a monitored media device;
   processing the audio line signal with a filter having adaptive weights to generate a delayed and attenuated line signal;
   subtracting the delayed and attenuated line signal from the audio input signal to develop a residual audio signal;
   identifying a person that spoke to create the human voice signal based on the residual audio signal; and
   logging an identity of the person as an audience member.

2. A method as defined in claim 1 wherein identifying the person further comprises:
   extracting one or more identifiers from the residual audio signal; and
   comparing the one or more identifiers extracted from the residual audio signal to a database of stored identifiers.

3. A method as defined in claim 2 wherein extracting one or more identifiers from the residual audio signal comprises:
   shifting a plurality of discrete samples of the residual audio signal into a buffer to form a digital audio line sample;
   performing a fast fourier transform on the digital audio line sample in the buffer to create an FFT spectrum;
   defining frequency bands in the FFT spectrum;
   transforming the frequency bands into coefficients; and
   selecting a set of the coefficients corresponding to vocal tract resonances as the one or more identifiers.

4. A method as defined in claim 3 further comprising padding the buffer to increase a length of the digital audio line sample.

5. A method as defined in claim 3 further comprising performing a windowing function to reduce block boundary effects.

6. A method as defined in claim 3 wherein the digital audio line sample includes the plurality of discrete samples of the residual audio signal and a plurality of discrete samples of an earlier residual audio signal.

7. A method as defined in claim 3 wherein the frequency bands are overlapping mel filter frequency bands.

8. A method as defined in claim 3 wherein transforming the frequency bands into the coefficients comprises transforming log spectral energy values associated with the frequency bands by a discrete cosine transform.

9. A method as defined in claim 3 wherein the set of the coefficients further comprises a coefficient substantially corresponding to a total energy of the digital audio line sample.

10. A method as defined in claim 1 wherein processing the audio line signal with the filter having adaptive weights to generate the delayed and attenuated line signal further comprises:
    sampling the audio line signal into samples;
    inputting the samples into a delay line;
    multiplying the samples with respective ones of the adaptive weights to generate a plurality of weighted samples; and
    summing the weighted samples.

11. A method as defined in claim 10 further comprising adjusting values of the adaptive weights.

12. A method as defined in claim 11 wherein adjusting the values of the adaptive weights comprises summing respective ones of the values of the adaptive weights with a respective one of a set of adjustment factors, each of the adjustment factors comprising a product of: (a) the residual audio signal at a first time, (b) a learning factor, and (c) a respective sample of the audio line signal at the first time.

13. A method as defined in claim 1 wherein processing the audio line signal with the filter having adaptive weights to generate the delayed and attenuated line signal comprises minimizing a least mean squared error.

14. A method as defined in claim 2 wherein extracting the one or more identifiers from the residual audio signal comprises extracting one or more mel frequency cepstral coefficients (MFCC) vectors from the residual audio signal.

15. A machine accessible medium storing instructions, which when executed, cause a machine to:
    obtain an audio input signal including a program audio signal and a human voice signal;
    receive an audio line signal from an audio output line of a monitored media device;
    process the audio line signal with a filter having adaptive weights to generate a delayed and attenuated line signal;
    subtract the delayed and attenuated line signal from the audio input signal to develop a residual audio signal;
    identify a person that spoke to create the human voice signal based on the residual audio signal; and
    log an identity of the person as an audience member.

16. An audience measurement device to identify audience members based on voice, the device comprising:
    a transducer to obtain an audio input signal including a program audio signal and a human voice signal;
    a filter having adaptive weights to receive an audio line signal from an audio output line of a monitored media device, and to process the audio line signal to generate a delayed and attenuated line signal;
    a difference detector to subtract the delayed and attenuated line signal from the audio input signal to develop a residual audio signal;
    an identification device to identify a person that spoke to create the human voice signal based on the residual audio signal; and
    a memory to log an identity of the person as an audience member.

17. An apparatus as defined in claim 16 wherein the identification device further comprises:
    a feature extractor to extract one or more identifiers from the residual audio signal; and
    a matcher to compare the one or more identifiers extracted from the residual audio signal to a database of stored identifiers.

18. An apparatus as defined in claim 17 wherein the feature extractor further comprises:
    a buffer to receive a plurality of discrete samples of the residual audio signal to form a digital audio line sample; and
    a processor to fast fourier transform the digital audio line sample in the buffer to create an FFT spectrum, to define frequency bands in the FFT spectrum, to transform the frequency bands into coefficients, and to select a set of the coefficients corresponding to vocal tract resonances as the one or more identifiers.

19. An apparatus as defined in claim 18 wherein the processor pads the buffer to increase a length of the digital audio line sample before transforming the digital audio line sample.

20. An apparatus as defined in claim 18 wherein the processor performs a windowing function to reduce block boundary effects associated with the fast fourier transform.

21. An apparatus as defined in claim 18 wherein the digital audio line sample includes the plurality of discrete samples of the residual audio signal and a plurality of discrete samples of an earlier residual audio signal.

22. An apparatus as defined in claim 18 wherein the frequency bands are overlapping mel filter frequency bands.

23. An apparatus as defined in claim 18 wherein the processor transforms the frequency bands into the coefficients by transforming log spectral energy values associated with the frequency bands with a discrete cosine transform.

24. An apparatus as defined in claim 18 wherein the set of the coefficients further comprises a coefficient substantially corresponding to a total energy of the digital audio line sample.

25. An apparatus as defined in claim 16 wherein the filter further comprises:
   an analog-to-digital converter to sample the audio line signal into samples;
   a delay line to receive the samples;
   a multiplier to multiply the samples with respective ones of the adaptive weights to generate a plurality of weighted samples; and
   an adder to sum the weighted samples.

26. An apparatus as defined in claim 25 further comprising a weight adjuster to adjust values of the adaptive weights.

27. An apparatus as defined in claim 26 wherein the weight adjuster adjusts the values of the adaptive weights by summing respective ones of the values of the adaptive weights with a respective one of a set of adjustment factors, each of the adjustment factors comprising a product of: (a) the residual audio signal at a first time, (b) a learning factor, and (c) a respective sample of the audio line signal at the first time.

* * * * *